United States Patent [19]

Heim et al.

[11] Patent Number: 5,481,831
[45] Date of Patent: Jan. 9, 1996

[54] VEHICLE DOOR

[75] Inventors: Gunther Heim, Obertshausen; Bruno Kroll, Radevormwald, both of Germany

[73] Assignee: YMOS Aktiengesellschaft Industrieprodukte, Obertshausen, Germany

[21] Appl. No.: 85,759

[22] Filed: Jun. 30, 1993

[30] Foreign Application Priority Data

Jun. 30, 1992 [DE] Germany .......................... 42 21 446.1

[51] Int. Cl.⁶ ........................................... B60J 5/04
[52] U.S. Cl. ........................................... 49/502; 296/146.6
[58] Field of Search ........................ 49/502; 296/146.5, 296/146.6

[56] References Cited

U.S. PATENT DOCUMENTS

| | | | |
|---|---|---|---|
| 4,861,097 | 8/1989 | Wycech | 296/146.6 X |
| 4,876,825 | 10/1989 | Widrig et al. | 49/502 |
| 4,958,884 | 9/1990 | Gold | 49/502 X |
| 4,969,680 | 11/1990 | Shimoda | 49/502 X |
| 5,137,325 | 8/1992 | Ohya | 49/502 X |
| 5,226,259 | 7/1993 | Yamagata et al. | 49/502 |

FOREIGN PATENT DOCUMENTS

| | | | |
|---|---|---|---|
| 1480089 | 8/1969 | Germany | 49/502 |
| 3934590 | 4/1991 | Germany | 49/502 |
| 1391780 | 4/1975 | United Kingdom | 296/146.6 |

*Primary Examiner*—Peter M. Cuomo
*Assistant Examiner*—Jerry Redman
*Attorney, Agent, or Firm*—W. G. Fasse; W. F. Fasse

[57] ABSTRACT

A vehicle door is constructed as a frame structure or as a shell body. The frame has at least one front and one rear frame section and an upper and a lower frame member respectively which are connected with each other. In the door constructed as a shell at least one outer section and one inner section are connected with each other to form the door body. At least one diagonal strut is provided in each door so that the diagonal strut is outwardly curved to distribute impact forces into load carrying points of the vehicle body or cell.

13 Claims, 11 Drawing Sheets

VEHICLE DOOR

FIELD OF THE INVENTION

The invention relates to a vehicle door, particularly for motor vehicles with a door frame having at least one front and one rear and one upper and one lower frame section. The invention further relates to a vehicle door constructed as a shell with at least one outer section and one inner section interconnected with each other to form a door body.

1. Background Information

Vehicle doors of the mentioned type are known in large numbers and satisfy the requirements to be met by such doors, basically in a satisfactory manner. However, improvements with regard to the crash characteristics of these doors are desirable, whereby this applies particularly to the door strength and stiffness in response to a lateral impact.

2. Object of the Invention

The invention thus arms to solve the problem to optimize the lateral impact strength and stiffness of vehicle doors.

SUMMARY OF THE INVENTION

The invention solves this problem by at least one diagonal outwardly vaulted strut, preferably two crosswise extending outwardly vaulted struts, extending diagonally between door frame junctions or door body points so positioned that an impact force is distributed to load carrying points in a vehicle body or cell.

This arrangement of at least one diagonal strut in the vehicle door below the closed window increases the lateral impact strength and stiffness of the door quite substantially. Thereby, the crash characteristic is also substantially improved by its outwardly directed convex vaulting, because the curved diagonal strut is able to take up and reduce higher forces than a strut that is not curved.

Further, advantages are achieved when the diagonal strut, according to a further embodiment of the invention, is secured to the frame components of the door frame or between the outer and inner door sections of a vehicle door made as a shell structure forming a door body at locations positioned in an area or close to load supporting points of the vehicle body or cell. The term "load supporting point of the vehicle body or cell" means in this context a point which is supported not only in the longitudinal direction of the vehicle, but also crosswise thereto. This feature is always present where the vehicle body or cell comprises cross stiffening beams or struts. In the case of a lateral impact, the vehicle door or its door frame or body is then in a position to directly transfer forces taken up by the diagonal strut to the vehicle body thereby introducing these forces or force components into the vehicle body or cell.

According to a further embodiment of the invention it is provided that the diagonal strut in the case of a driver side door or front vehicle door extends from the area of an upper hinge downwardly in the direction toward a bottom junction point of the B-column of a vehicle body. In the case of a rear vehicle door, the diagonal strut extends preferably from a location close to the lower end of the B-column toward the door lock of the vehicle door.

BRIEF DESCRIPTION OF THE DRAWINGS

The invention will now be described in more detail with reference to example embodiments which are shown in the drawing.

DETAILED DESCRIPTION OF PREFERRED EXAMPLE EMBODIMENTS AND OF THE BEST MODE OF THE INVENTION

Figure 1:
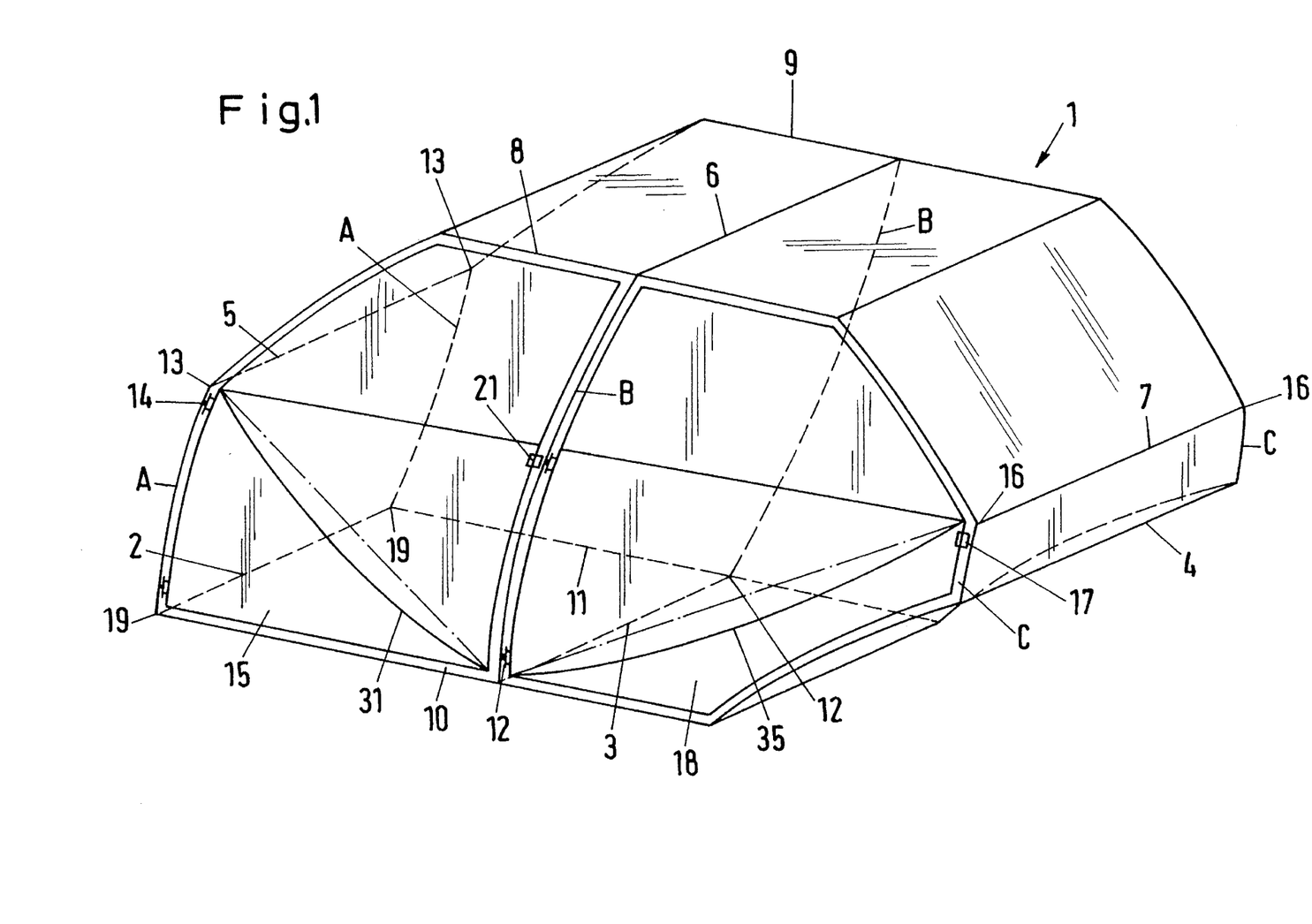
FIG. 1 shows a schematic, perspective illustration of the vehicle cell or body of a vehicle having four doors.

FIG. 1 shows schematically a vehicle cell or body 1 of a motor vehicle with four vehicle doors. The vehicle cell or body 1 comprises A-columns, B-columns, and C-columns which are interconnected with one another with the aid of cross-struts 2, 3, and 4 or 5, 6, and 7. Further, roof longitudinal beams 8 and 9 as well as floor longitudinal beams 10 and 11 are provided. The connection point of the several columns A, B, and C with the cross-struts 2 to 7 and the roof longitudinal beams 8, 9, and the floor longitudinal beams 10, 11 form junction or rather load carrying points, whereby the load carrying points 12 at the lower ends of the B-columns, and the junction points 13 close to an upper hinge member 14 for the front vehicle door 15, and junction points 16 close to the door locks 17 of the rear vehicle doors 18 are especially important.

Figure 9:
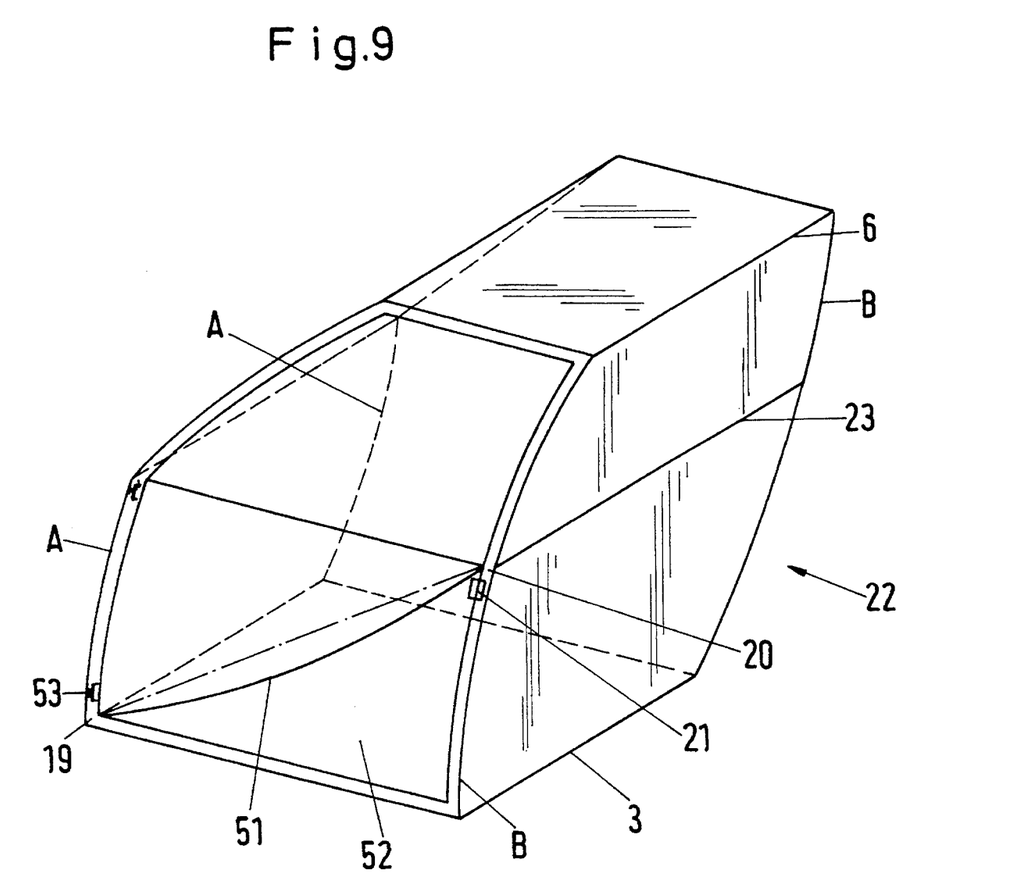
FIG. 9 is a schematic, perspective illustration of the vehicle body or cell of a vehicle with two vehicle doors and with a cross-brace between the B-columns at a level of the lower window opening edge.

Further, the load carrying points 19 of the vehicle cell or body 1 at the lower end of the A-columns, and possible load carrying points 20 at the level of the door locks 21 in case of a vehicle with only two doors according to the vehicle cell or body 22 shown in FIG. 9, are important for the construction of the front vehicle doors 15. This applies if a further cross-strut or cross-brace 23 is provided behind the two seats in parallel to the two cross-struts or braces 3 and 6 which interconnect the B-columns.

Parts that are absolutely of the same type are provided with the same reference numbers. This applies to the different vehicle cells or bodies and for the different vehicle doors corresponding to the several different example embodiments.

Figure 2:
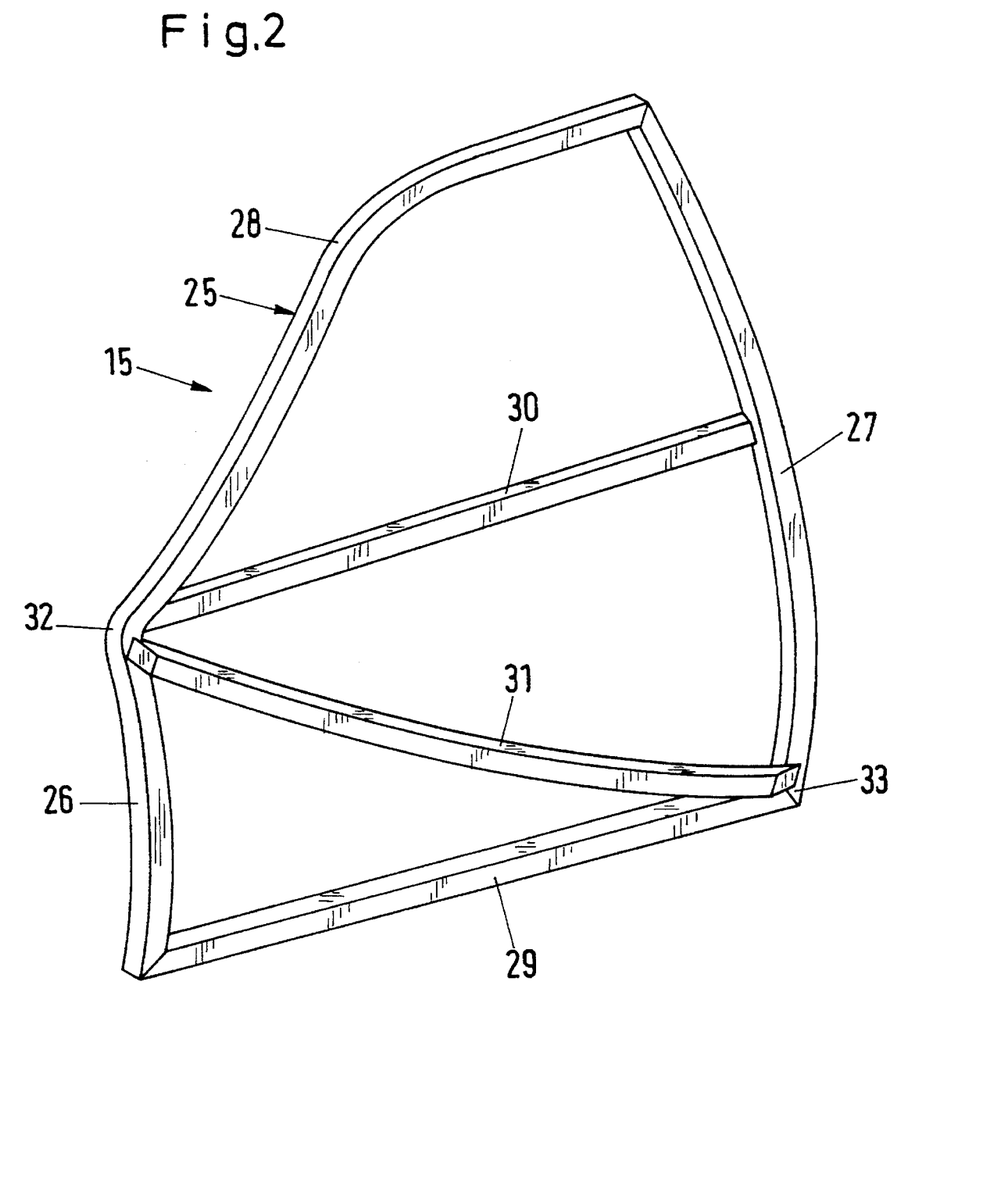
FIG. 2 is a schematic, perspective view of the door frame of a front vehicle door on an enlarged scale.

FIG. 2 shows a door frame 25 of a front vehicle door 15, the driver's door constructed with a door frame. The door frame 25 comprises a front frame section 26, a rear frame section 27, an upper frame member 28, and a lower frame member 29. Additionally, there are provided a horizontally extending frame member 30 functioning as the lower window frame and a diagonal strut 31.

The several frame sections and members 26 to 30 and the outwardly vaulting diagonal strut 31 are connected with each other in the area of door junction points. The diagonal outwardly vaulting strut 31 extend, substantially from a junction point 32 which connects the front frame section 26 with the upper frame member 28 and the horizontal frame member 30, to a junction point 33 forming the rear lower corner of the door frame 25 in the area where the rear frame section 27 is connected to the lower frame member 29. Thus, the diagonal strut 31 of the front vehicle door 15 extends at an angle to the longitudinal direction of the vehicle from the front and from above backwardly and downwardly. Further, the junction points 32 and 33 of the door frame 25 are positioned directly next to or in the vicinity of the load carrying points 12 and 13 of the vehicle body or cell 1. When a lateral impact occurs, the diagonal strut 31 can brace itself with its ends against the components which transmit the occurring force components directly into the load carrying points 12 and 13 of the vehicle cell or body 1.

Figure 3:
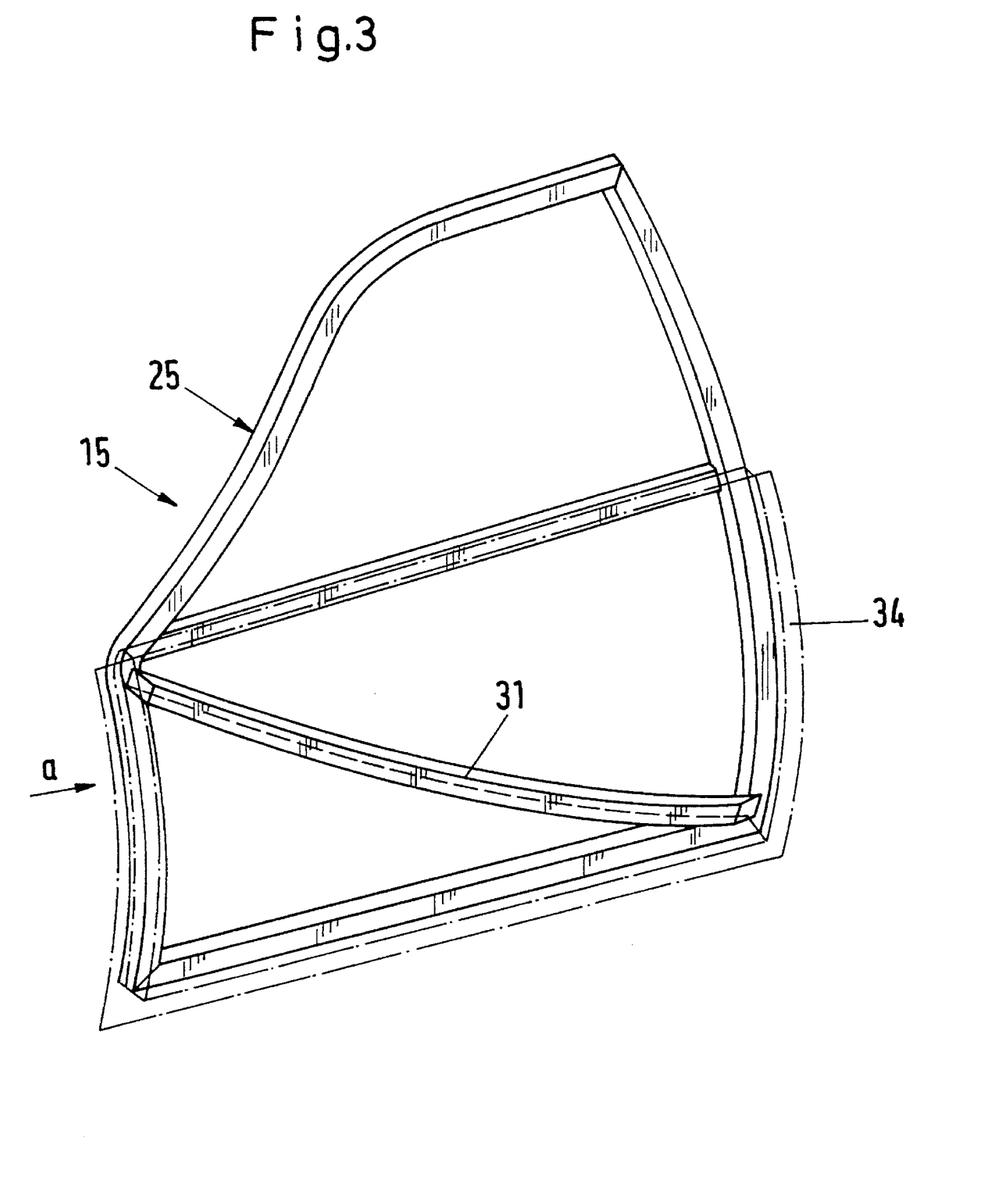
FIG. 3 shows a schematic illustration as in FIG. 2 with a door outer skin or panel additionally indicated by dash-dotted lines.

The diagonal strut 31 is located below the door outer skin or shell 34 in a finished vehicle door 15. The outer skin or shell 34 is shown by dashed or dash-dotted lines in FIGS. 3 and 4.

Comparing FIGS. 1 and 2, it is seen that the diagonal strut 31 of the front vehicle door 15 extends from an area of the upper hinge 14 at an angle downwardly in the direction torward the lower load carrying point 12 of the B-column of the vehicle cell or body 1. In the case of a rear vehicle door 18, the corresponding diagonal strut extends from a position close to the floor end of the B-column or from the point 12 in the direction of the load carrying point 16 or the door lock 17 respectively.

Figure 4:
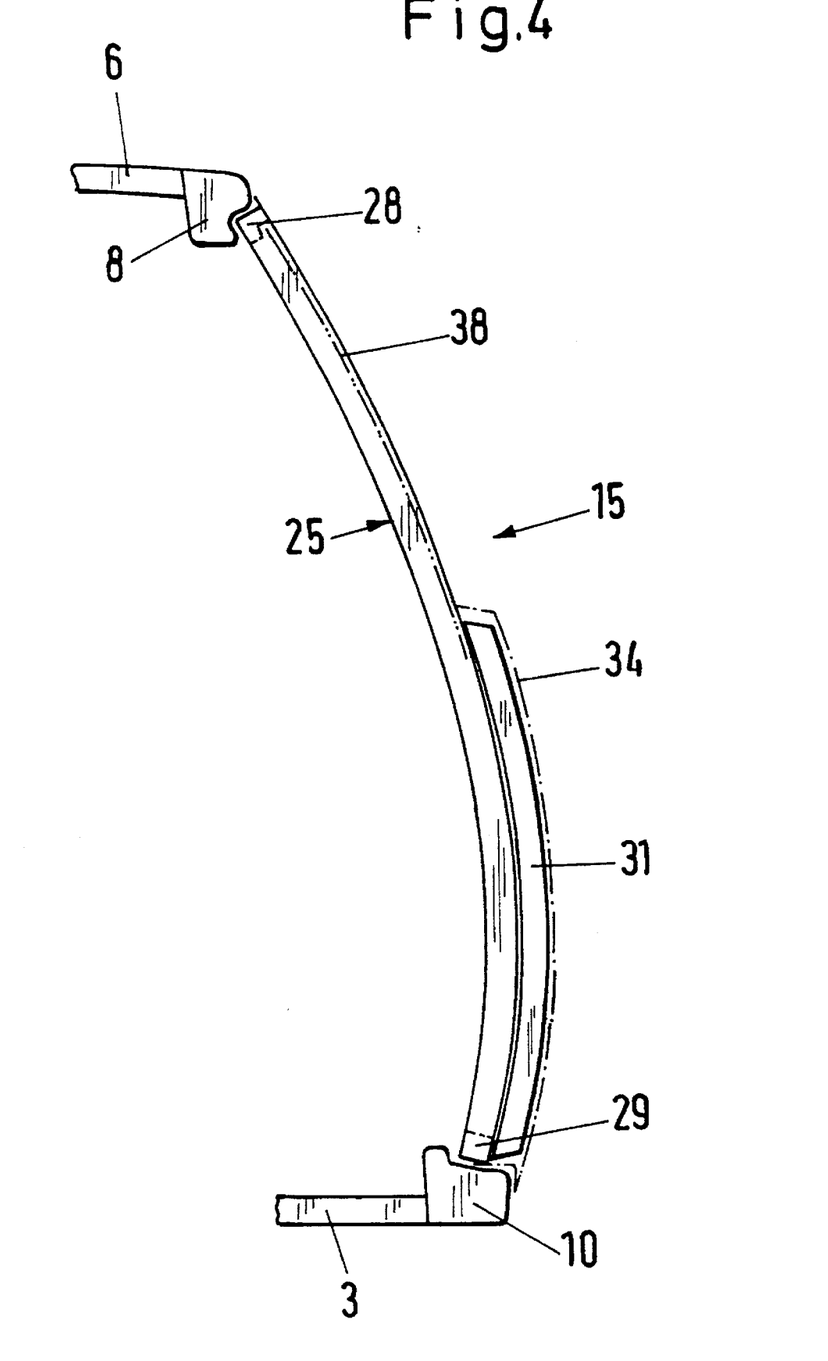
FIG. 4 is a schematic illustration of the door frame as viewed in the direction of the arrow a in FIG. 3.
Figure 5:
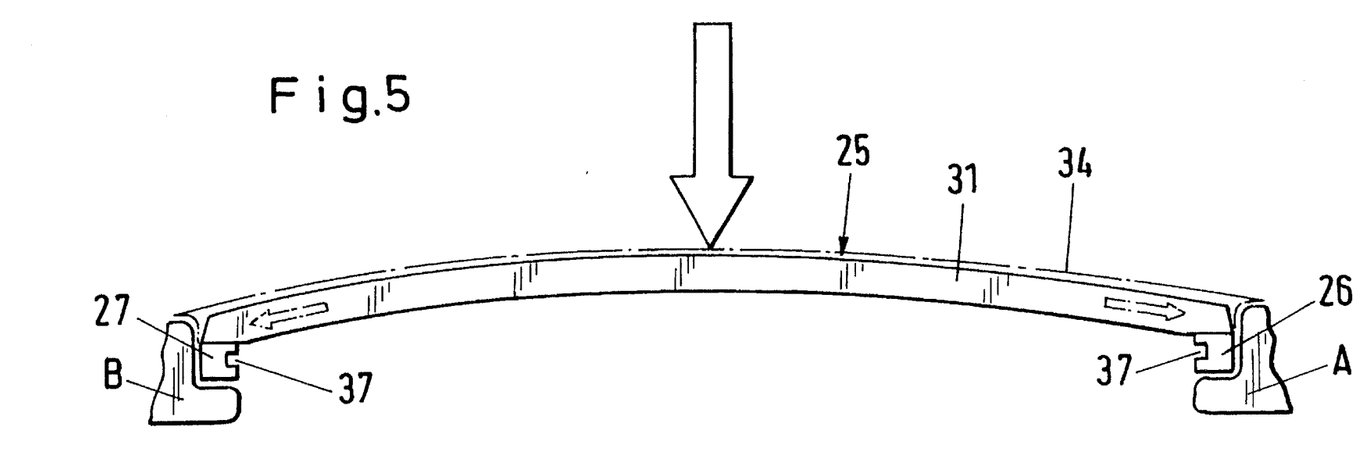
FIG. 5 is a plan view of the diagonal strut still vaulted prior to application of a strut straightening impact force.
Figure 6:
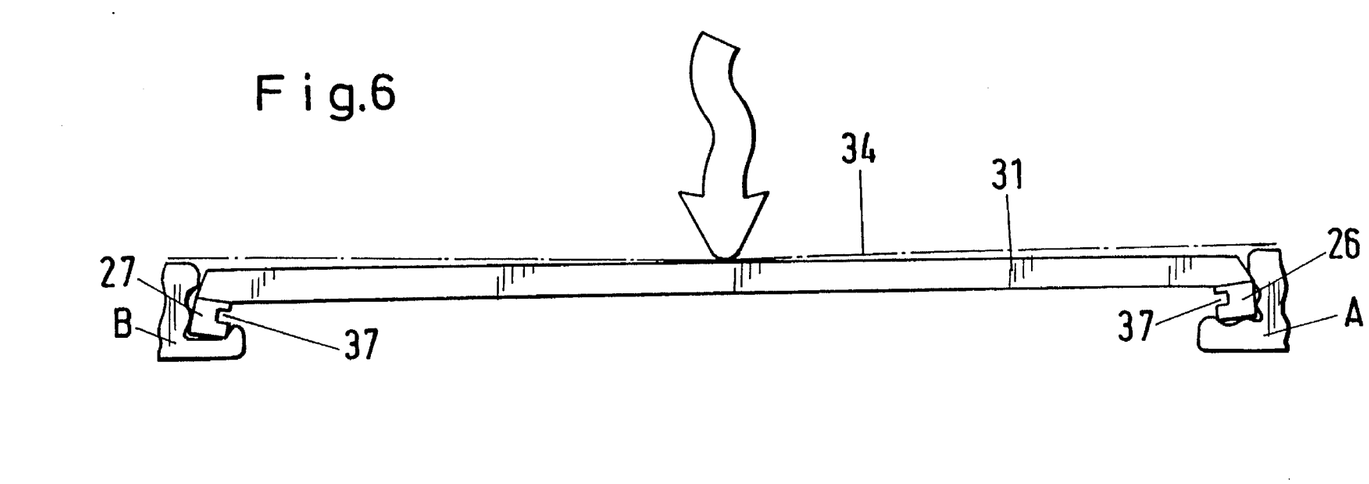
FIG. 6 is a plan view as in FIG. 5 showing the application of a strut straightening impact force.

Both FIGS. 5 and 6 show the diagonal outwardly vaulted strut 31 with the frame sections 26 and 27 between the A-column and the B-column. Additionally, FIGS. 5 and 6 show also the window pane guide 37 for the side window 38, see FIG. 4. The diagonal strut 31 is preferably located respectively outside of the window pane guide 37 as is also apparent from FIG. 4. The window pane guide 37 is not shown in the other FIGS. for a better overview. The vaulting is always directed outwardly from a door frame plane or from a door body plane as viewed from the inside of the vehicle body.

Prior to a lateral strut straightening impact, the diagonal strut 31 has the outwardly vaulted or curved shape as shown in FIG. 5. Further, in this state the door frame 25 is positioned with some play between the A-column and the B-column. When a lateral strut straightening impact occurs, the diagonal strut 31 is deformed and loses its original curved or vaulted shape, whereby the strut 31 is stretched and absorbs energy by being deformed. Due to the position of the ends of the diagonal strut 31, the latter as it straightens introduces impact force components into the A-column, into the B-column, and into the floor of the vehicle, when the diagonal strut 31 is straightened. This force introduction is so, because the diagonal strut 31 braces itself with its ends in the direction of the main force component and in a direction perpendicularly thereto, after the originally present play between the ends of the diagonal strut 31 and the columns A and B respectively is removed, see FIG. 6.

Figure 7:
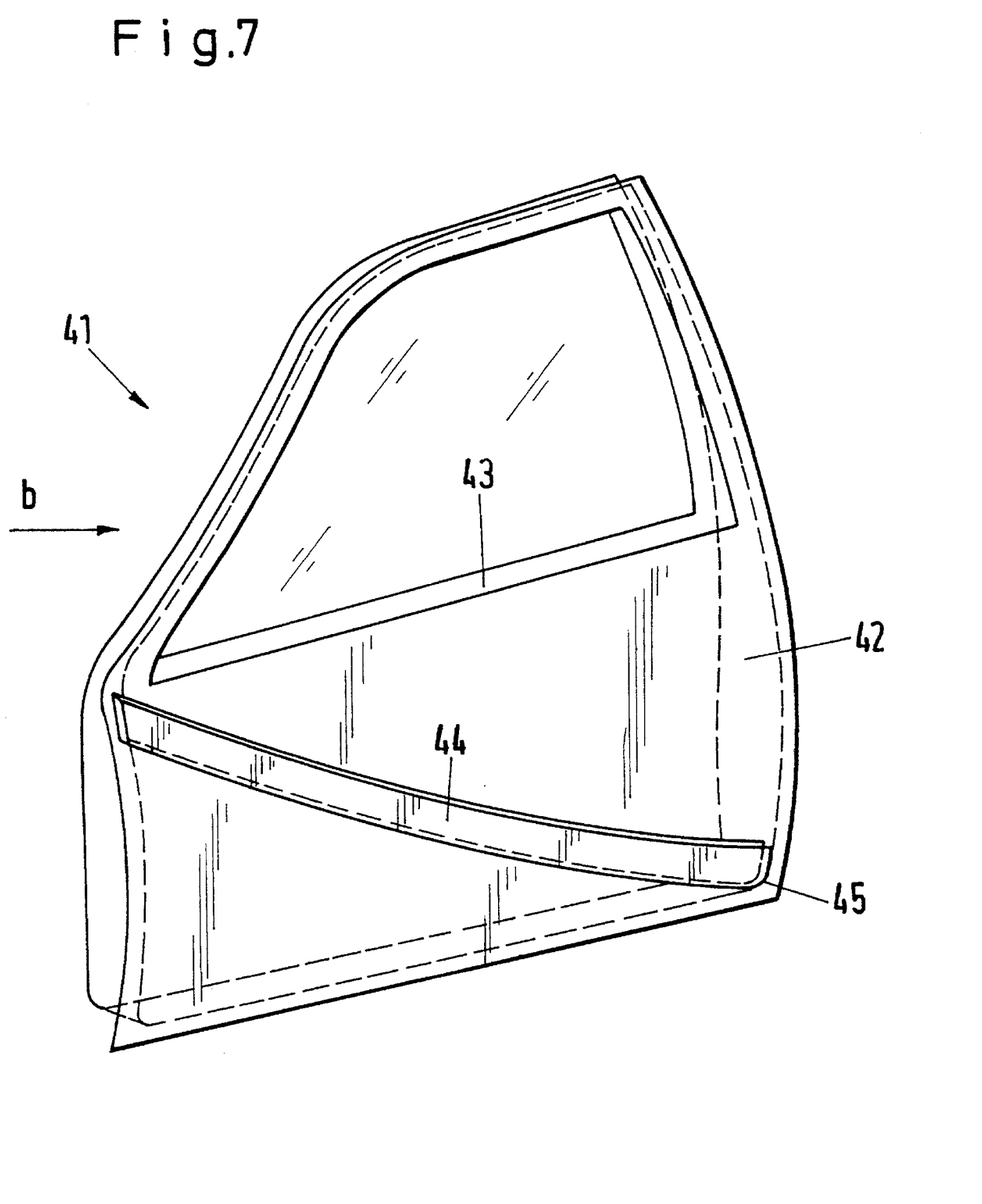
FIG. 7 is a schematic illustration as in FIG. 3 of a front vehicle door made as a shell structure forming a door body.

FIG. 7 shows a vehicle door 41 in shell construction with an outer shell section 42 and an inner shell section 43 between which a diagonal strut 44 is arranged as in the frame construction of the vehicle door 15. The sections 42 and 43 together form a door body and the seam between the two sections forms a door plane out of which a diagonal strut 44 vaults. The diagonal strut 44 extends again in the case of a front vehicle door 41 from an area of the upper hinge 14, see FIG. 1, slanting downwardly in the direction toward the floor load carrying point 12 of the B-column or toward the lower rear corner 45 of the vehicle door 41.

Figure 8:
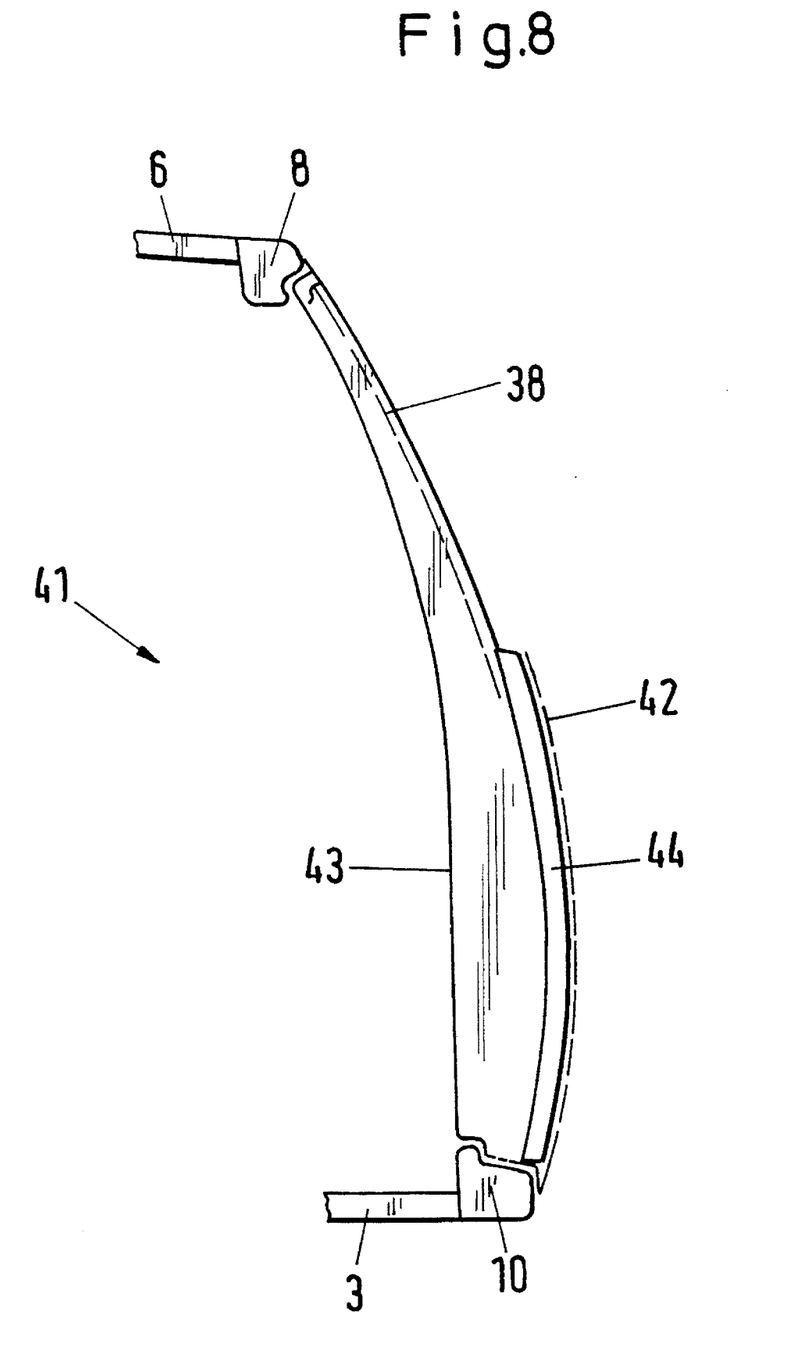
FIG. 8 is a view as in FIG. 4 of the vehicle door according to FIG. 7.

FIG. 8 shows similarly to FIG. 4, a schematic view of a vehicle door 41 as viewed in the direction of the arrow b in FIG. 7. Here again, it is apparent that the diagonal strut 44 is positioned outside the window pane guide for the side window 38 and between the outer door section 42 and the inner door section 43.

Figure 10:
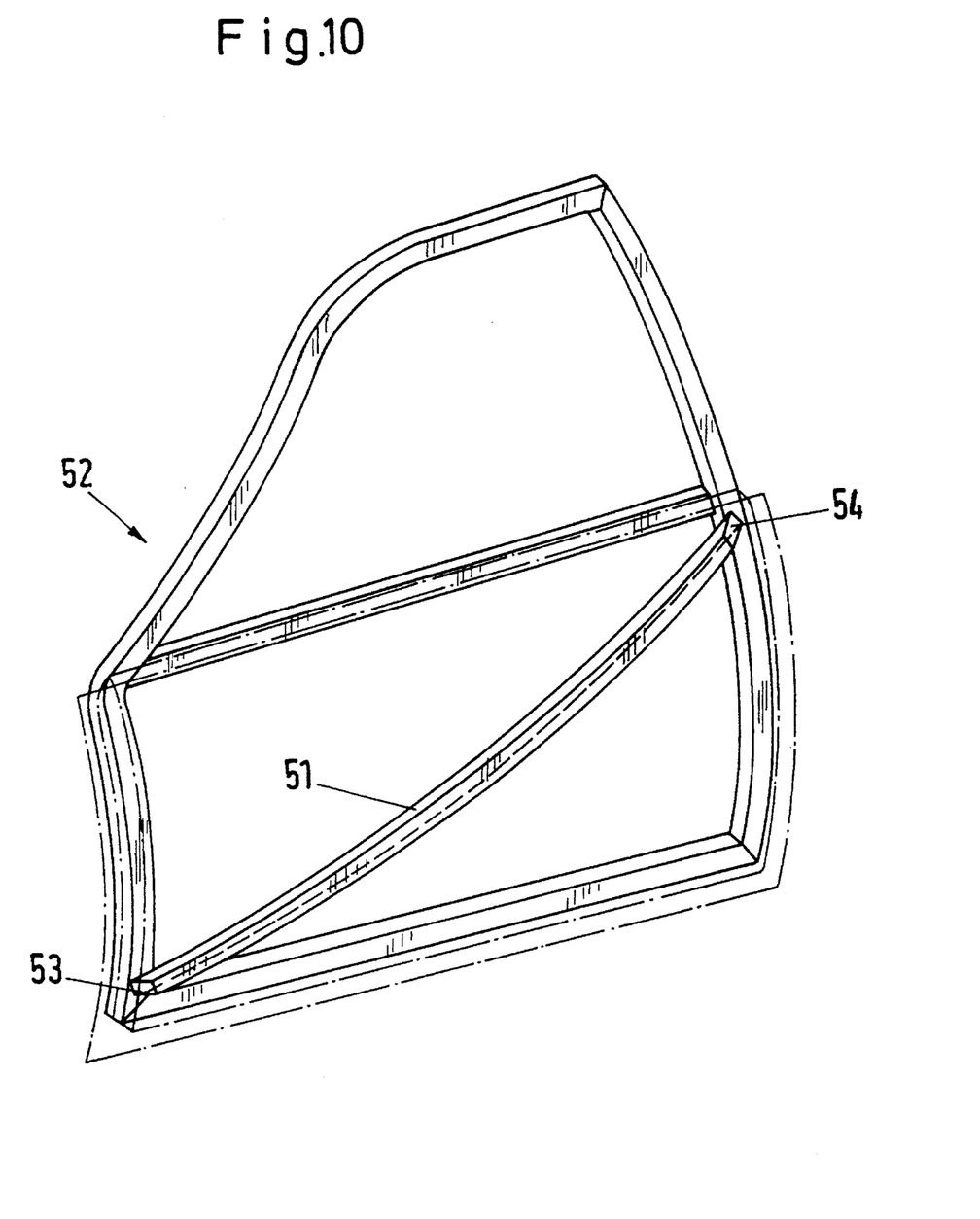
FIG. 10 is a schematic, perspective illustration of the driver side door for a vehicle with a vehicle cell or body according to FIG. 9 on an enlarged scale.

FIG. 9 relates to the above mentioned vehicle cell or body 22 with a cross-strut 23 of a two-door or two seater vehicle or a three seater vehicle, for example, with a centrally located engine. Here, the diagonal strut 51, as viewed in the longitudinal vehicle direction, may extend from the lower front end slanting backwardly and upwardly, whereby the struts extend substantially from the lower hinge 53 at the A-column to the door lock 21 in the area of the B-column. Thus, the ends 53 and 54, see FIG. 10, of the diagonal strut 51 are then located substantially at the load carrying points 19 and 20 of the vehicle cell or body 22, whereby the diagonal strut can introduce forces that it has taken up, directly into the load carrying points 19 and 20 of the vehicle body.

Figure 11:
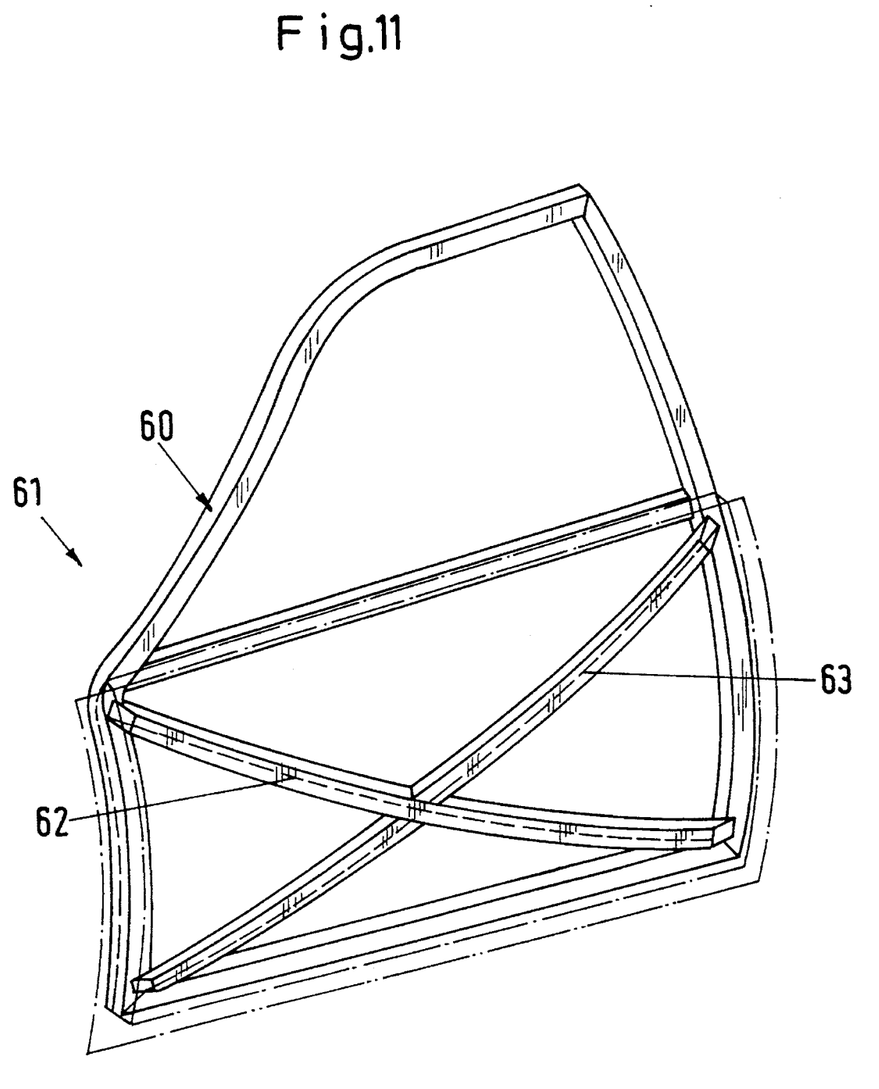
FIG. 11 is a schematic, perspective illustration of a door frame with two diagonal struts crossing each other.

As shown in FIG. 11, the diagonal strut in a two door vehicle may basically also run, as viewed in the longitudinal vehicle direction, from a front upper point to a rear lower point as shown in FIG. 2. Further, the door frame 60 of a vehicle door 61 may comprise crossing diagonal struts 62 and 63. These two crossing diagonal struts 62, 63 have three ends connected to three respective door frame junctions and one end connected approximately centrally to one of the door frame sections as shown in FIG. 11.

Figure 12:
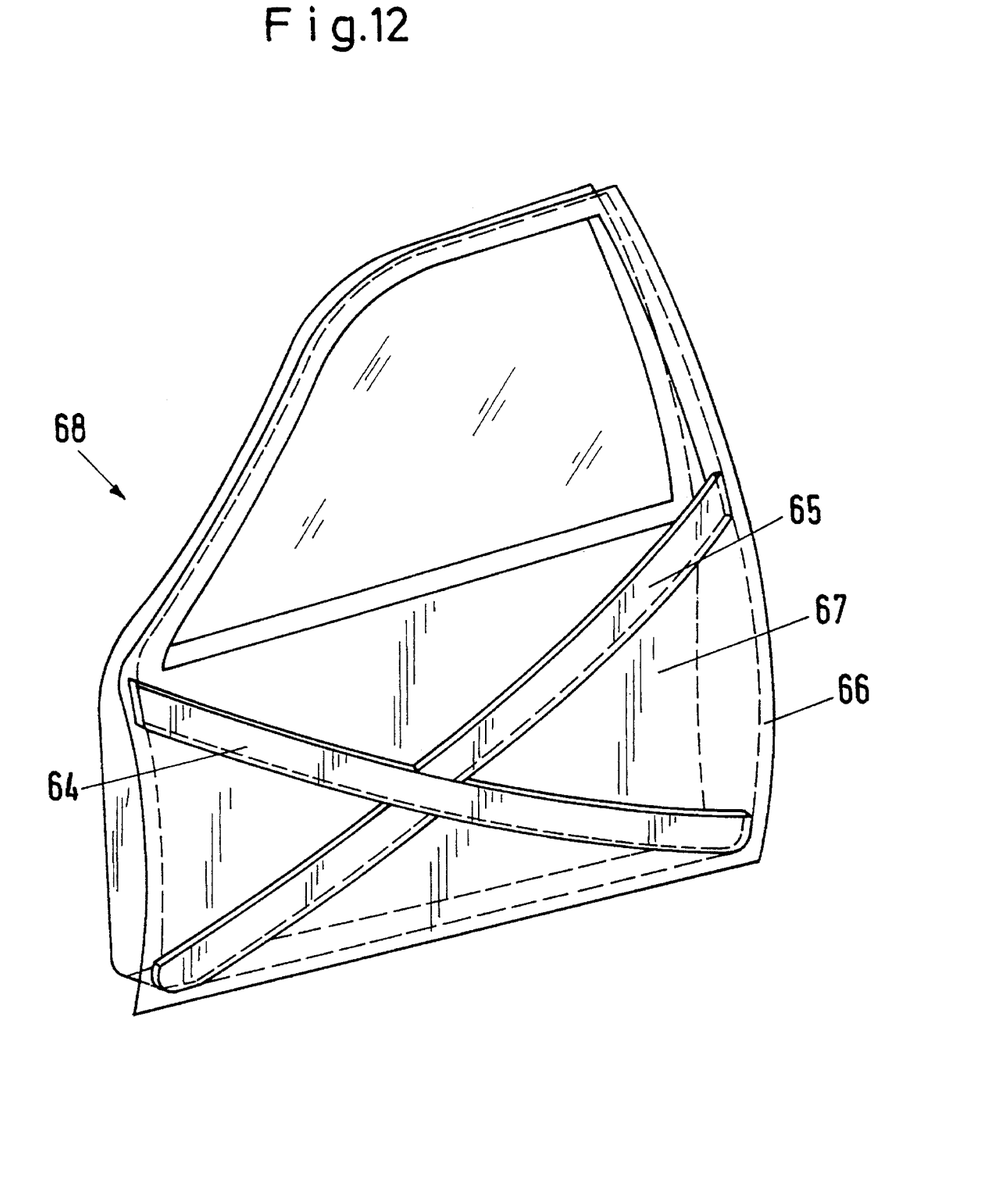
FIG. 12 is an illustration as in FIG. 11 of a vehicle door made as a shell structure with two diagonal struts crossing each other.

Referring to FIG. 12, crossing diagonal struts 64 and 65 may be arranged between an outer shell section 66 and an inner shell section 67 of a shell type door 68 for which the shell sections form a door body. The use of crossing diagonal struts 62 to 65 further increases the stiffness and strength of vehicle doors.

Further, it applies to all embodiments of the invention that the diagonal struts are respectively curved or vaulted outwardly and that their ends are arranged in the vehicle door in such a manner that the ends of the struts are positioned at a level of load carrying junction points of the vehicle cell or body.

The above principle also applies to rear vehicle doors as for the front vehicle doors. The invention is thus not limited to the example embodiments shown in the figures. Rather, the basic teaching is applicable to other doors.

We claim:

1. A vehicle door comprising a door frame including at least one front frame section (26), at least one rear frame section (27), at least one lower frame member (29) and at least one upper frame member (30), door frame junctions (32, 33) at which said frame sections and said frame members are connected to each other to form said door frame that defines a frame plane, at least one diagonal strut (31, 35) connected at its ends to two of said door frame junctions (32, 33) positioned diagonally opposite each other, said at least one diagonal strut having a curvature vaulted out of said frame plane as viewed from inside a vehicle, whereby said diagonal strut is positioned for transferring an impact force component applied to said diagonal strut from outside a vehicle, to said two door frame junctions (32, 33) positioned diagonally opposite each other.

2. The vehicle door of claim 1, further comprising in said door frame structure a window pane guide, said diagonal strut being arranged outside said window pane guide as viewed from inside a vehicle.

3. The vehicle door of claim 1, further comprising an upper hinge member (14) connected to said door frame forming part of a front door of a vehicle, said diagonal strut (31, 44) slanting downwardly from an area of said upper hinge member to a load carrying point (12) of a B-column of said vehicle body.

4. The vehicle door of claim 1, further comprising a lower hinge member (53) connected to said door frame forming part of a door of a two-door vehicle, said at least one diagonal strut (51) slanting upwardly from an area of said lower hinge member (53) to a load carrying point (20) of said vehicle body, and wherein said load carrying point (20) is positioned in an area where a cross-brace (23) of said vehicle body connects two B-columns of said vehicle body.

5. The vehicle door of claim 4, further comprising a door lock (21) mounted in said door frame in an area where said load carrying point (20) is positioned, said at least one diagonal strut (51) extending toward said door lock (21).

6. The vehicle door of claim 1, further comprising a door lock (17) mounted in said door frame, wherein said vehicle door is a rear door, and wherein said diagonal strut (35) extends upwardly from a load carrying point (12) of a B-column of said vehicle body toward said door lock (17).

7. The vehicle door of claim 1, comprising at least two diagonal struts (62, 63) each having a curvature vaulted out of said frame plane, said at least two diagonal struts crossing each other.

8. The vehicle door of claim 1, comprising at least two diagonal struts (62, 63) each having a curvature vaulted out of said frame plane, said at least two diagonal struts (62, 63) crossing each other, said at least two diagonal struts (62, 63) having three ends connected to three of said door frame junctions and one end connected centrally to one of said frame sections.

9. A vehicle door comprising a door body including an outer shell section and an inner shell section connected to said outer shell section along a seam to form said door body, said seam defining a door body plane, two diagonal struts (64, 65), each of said diagonal struts being connected at its ends to two diagonally opposite points in a lower portion of said door body so that four connecting points are formed, each of said two diagonal struts having a curvature vaulted out of said door body plane as viewed from inside a vehicle, said two diagonal struts crossing each other substantially centrally in said lower door portion, whereby said diagonal struts are positioned for transferring an impact force component applied to said diagonal struts from outside said vehicle, to said four connecting points in said door body, wherein said door body further comprises a window pane guide, and wherein said two diagonal struts are arranged outside said window pane guide as viewed from inside a vehicle.

10. The vehicle door of claim 9, further comprising an upper hinge member (14) connected to said door body forming part of a front door of a vehicle, one strut (64) of said two diagonal struts (64, 65) slanting downwardly from an area of said upper hinge member (14) to a load carrying point of a B-column of a vehicle body.

11. The vehicle door of claim 9, further comprising a lower hinge member (53) connected to said door body forming part of a door of a two-door vehicle, one strut (65) of said two diagonal struts (64, 65) slanting upwardly from an area of said lower hinge member (53) to a load carrying point (20) of a vehicle body, and wherein said load carrying point (20) is positioned in an area where a cross-brace (23) of said vehicle body connects two B-columns of a vehicle body.

12. The vehicle door of claim 11, further comprising a door lock (21) mounted in said door body in an area where said load carrying point (20) is positioned, said one diagonal strut (65) extending toward said door lock (21) and connected to said door body substantially where said door lock is located.

13. The vehicle door of claim 9, further comprising a door lock mounted in said door body, wherein said vehicle door is a rear door, and wherein one strut of said two diagonal struts extends upwardly from a load carrying point (12) of a B-column of a vehicle body toward said door lock (17).

\* \* \* \* \*

UNITED STATES PATENT AND TRADEMARK OFFICE
CERTIFICATE OF CORRECTION

PATENT NO. : 5,481,831
DATED : Jan. 9, 1996
INVENTOR(S) : Heim et al.

It is certified that error appears in the above-identified patent and that said Letters Patent is hereby corrected as shown below:

Title page
In [30] Foreign Application Priority Data
  replace "42 21 446.1" by --42 21 466.1--.

Col. 1, line 19, replace "arms" by --aims--.
Col. 3, line 11, replace "extend" by --extends--;
  line 34, replace "torward" by --toward--.

Signed and Sealed this

Fourth Day of June, 1996

Attest:

BRUCE LEHMAN

*Attesting Officer*   *Commissioner of Patents and Trademarks*